(12) United States Patent
Savaroche (10) Patent No.: US 11,508,121 B2
(45) Date of Patent: Nov. 22, 2022

(54) METHOD FOR ANNOTATING POINTS ON A HAND IMAGE TO CREATE TRAINING DATASET FOR MACHINE LEARNING

(71) Applicant: Qualcomm Technologies, Inc., San Diego, CA (US)

(72) Inventor: Kim Savaroche, Talence (FR)

(73) Assignee: QUALCOMM TECHNOLOGIES, INC., San Diego, CA (US)

( * ) Notice: Subject to any disclaimer, the term of this patent is extended or adjusted under 35 U.S.C. 154(b) by 47 days.

(21) Appl. No.: 17/129,362

(22) Filed: Dec. 21, 2020

(65) Prior Publication Data
US 2022/0198747 A1    Jun. 23, 2022

(51) Int. Cl.
*G06T 17/00*  (2006.01)
*G06T 7/50*  (2017.01)
*G06N 3/04*  (2006.01)

(52) U.S. Cl.
CPC .............. *G06T 17/00* (2013.01); *G06N 3/04* (2013.01); *G06T 7/50* (2017.01); *G06T 2207/10028* (2013.01); *G06T 2207/20084* (2013.01)

(58) Field of Classification Search
None
See application file for complete search history.

(56) References Cited

U.S. PATENT DOCUMENTS

| | | |
|---|---|---|
| 2020/0090409 A1 | 3/2020 | Fink et al. |
| 2020/0151884 A1 | 5/2020 | Vajapey et al. |
| 2020/0327418 A1* | 10/2020 | Lyons .................... G06V 10/82 |
| 2021/0074016 A1* | 3/2021 | Li .......................... G06F 3/017 |

FOREIGN PATENT DOCUMENTS

WO    2017031385 A    2/2017

OTHER PUBLICATIONS

Zhao et al.; "Hand-3d-Studio: A New Multi-View System for 3d Hand Reconstruction;" CASSP 2020-2020 IEEE International Conference on Acoustics, Speech and Signal Processing (ICASSP), 2020, pp. 2478-2482 (Year: 2020).*
Rui et al.; A survey on 3D hand pose estimation: Cameras, methods, and data sets, Pattern Recognition, vol. 93, 2019, pp. 251-272 (Year: 2019).*

* cited by examiner

*Primary Examiner* — Peter Hoang
(74) *Attorney, Agent, or Firm* — Qualcomm Technologies, Inc.

(57) ABSTRACT

A method for annotating points on a 2D image of a hand, includes:
  capturing several images of the hand from different views;
  for each viewpoint, the hand is imaged using cameras including: one first 2D camera and one 3D camera;
  using a 3D engine for:
    creating a 3D hand representation from the 3D camera;
    considering a 3D model of an articulated hand with predefined annotation points;
    considering several 3D viewpoints of the hand;
    for each viewpoint considered:
  modifying the articulated hand to be superimposed with the 3D representation;
    considering a 2D image captured from the first 2D camera;
    superimposing the modified articulated hand on the hand captured on the 2D image;
    applying the annotation points of the modified articulated hand on the hand captured on the 2D image; and
  storing the 2D image with annotation on the hand.

20 Claims, 4 Drawing Sheets

METHOD FOR ANNOTATING POINTS ON A HAND IMAGE TO CREATE TRAINING DATASET FOR MACHINE LEARNING

BACKGROUND

The present invention relates to a method for annotating points on 2D images of a hand. Annotating points are key points placed on strategic area of the hand. The key points allow the hand to be completely recognized by computer in an augmented reality or virtual reality.

In computer vision, hand tracking involves extracting the pose of the hand for each image included in a video, or in a sequence of images. A hand pose can generally be expressed as a collection of the locations of the joints of the fingers and the palm. Hand tracking is gaining momentum in academia and industry due to its broad applications, such as human-machine interaction, robotic design, avatar animation, gesture comprehension and augmented reality. Although a lot of effort has been put into this area, hand tracking remains very difficult due to these issues:

large dimensional configuration space of the hand pose;
homogeneous distribution of the colors of the skin of the hand;
frequent self-occlusion and occlusion by other objects;
quick hand movement.

In order to improve the hand tracking system, it is imperative to effectively detect a hand. Given the diversity of hands, machine learning technology seems to be a good candidate for effective hand identification. However, designing a machine learning engine requires a lot of training data.

The performance of Machine Learning (ML), whether it is considered supervised or unsupervised, depends primarily on the learning training dataset used. This training dataset is supposed to be made up of a large population of annotated samples representing the various possible contexts of use and the expected results in these situations. For generalization to be possible, that is, for predictions to be correct on data not present in the training samples, the training dataset must be fairly substantial.

In the context of gesture recognition, for example, learning samples are mostly 2D images in which a hand adopts a particular pose. Depending on the pose, a gesture is recognized and an action is triggered by software. This software is particularly in demand in the context of AR/VR (Augmented Reality/Virtual Reality) headsets. The problem added by this material is that the rendering expected by the users is in 3D whereas the shooting cameras are generally 2D cameras. Indeed, the AR/VR equipment has a display screen for the user in 3D. It is therefore imperative to deduce the position of the hand in 3D space from 2D cameras which are most often monochrome. Training datasets of ten thousand samples minimum are available on the internet. In theory, the samples should be varied: hands of different ethnicities and sizes, different environments and changing light conditions. If these variations are not respected, the result of the learning called "model" may be over-trained.

The creation of substantial training datasets is necessary for each new 2D camera used in the AR/VR equipment and each new point of view (front or back camera of the smartphone, above the console of a car, in an AR/VR, etc.). This creation of samples is usually manual and can be particularly time consuming. Manual annotation of, say, twenty-two points for a 3D image can take up to four minutes with a simple 3D engine. It involves placing for example twenty-two points on predefined joints and areas of the hand. Another disadvantage of the manual method is that without physical constraints or length benchmarks, the Z (depth) is annotated differently depending on the annotator. For the same hand, the fingers can vary from five to twenty centimeters apart depending on the annotator. In cases where part of the hand is hidden, the position of the fingers can be difficult to deduce.

Document US20200151884A1 discloses an automated annotated object tracking tool that allows machine-learning teams to annotate an object within a frame and have that annotation persist across frames as the annotated object is tracked within a series of frames.

Document WO2017031385A1 discloses a user device within a communication architecture, the user device comprising an asynchronous session viewer configured to receive asynchronous session data, the asynchronous session data comprising at least one image, camera pose data associated with the at least one image, and surface reconstruction data associated with the camera pose data; select a field of view position; and edit the asynchronous session data by adding/amending/deleting at least one annotation object based on the selected field of view.

Document US20200090409A1 discloses a method comprising the steps of capturing a first image at a location and location data associated with the first image; placing an augmented reality (AR) object within the first image with reference to the location data associated with the first image; storing the AR object and location data associated with the first image; and placing the AR object into a second image when location data associated with the second image corresponds to the location data associated with the first image.

The object of the present invention is to propose a dynamic solution in the recognition of gestures. Another goal of the invention is a new fast and efficient method for creating training data for a machine learning engine. Another object of the invention is a new method for creating rich data to improve learning when machine learning is used.

SUMMARY

At least one of the above-mentioned objects is achieved with a method for annotating points on a 2D image of a hand, the method comprising:

capturing several images of the hand from different points of view,
for each point of view, the hand is imaged using an assembly of cameras comprising at least: one first 2D camera and one 3D camera,
using a 3D engine for:
  creating a 3D representation of the hand from the 3D camera,
  considering a 3D model of an articulated hand wherein annotation points are predefined,
  considering several points of view of the hand in the 3D representation;
  for each point of view considered, realizing following steps:
modifying the articulated hand so as to be superimposed with the 3D representation,
  considering a 2D image captured from the first 2D camera, for example preferably at the same time as images used to create the 3D representation at the pending point of view,
  superimposing the modified articulated hand on hand captured on the 2D image,
  applying the annotation points of the modified articulated hand on the hand captured on the 2D image,
storing the 2D image with annotation on the hand.

The present invention uses the benefits of 3D images to place annotation points on 2D images. Another advantage of the present invention is a high precision in the placement of annotation points on the hand. The method of the invention is faster than the manual method according to the prior art.

As the method according to the invention uses real 3D images, the texture rendering is perfect, which greatly improves training when machine learning is used. Computer steps of the present invention can be carried out by a processing unit. With the method according to the invention each 2D image can be annotated. Advantageously, 2D images can constitute training dataset that can be used for training anomaly detection model in a machine learning system. Capturing images in different points of view allows for large amount of images available under various circumstances. Cameras are synchronized so that it is possible to retrieve images obtained from all cameras at a given same time.

The invention makes it possible to create training dataset for any kind of 2D camera. The training dataset can be used to create a machine learning model for a virtual reality or an augmented reality system based on the first 2D camera.

The camera assembly is arranged so that the first 2D camera is removable. Each new camera which training dataset has to be determined takes the place of the first 2D camera according to the invention. The annotation phase according to the invention is much faster and more precise than the manual annotation of each key point. Since it does not depend on an iteration algorithm or a machine learning model, it takes place in real time. The estimated time for annotating the first frame can be for example few minutes and then few seconds for each subsequent frame in the sequence. For a sequence of one minute at 30 FPS, for a total of 1,800 images, the annotation of the latter would last 2 hours and 30 minutes. This estimate makes more sense when compared to that of a conventional 22-points manual annotation that would amount to 150 hours for the same volume of frames. The articulated hand is a synthetic hand that is predetermined by computer and comprises annotation points in the right places.

According to the invention, the first 2D camera can be a monochrome or a RGB or a thermographic camera. The monochrome camera can be a black and white camera.

According to an embodiment of the invention, during the step of capturing, the hand can keep the same gesture, and the assembly of cameras turns relatively around the hand. A first case can be the situation wherein the assembly turns around a fixed hand. Another case can be the situation wherein the assembly is fixed and the hand pivots on itself while keeping the same gesture. It is therefore possible to obtain several thousand images for a capturing phase of few minutes. Those configurations allow for capturing the hand in different points of view. Preferably the hand keeps the same gesture so that to accelerate the step of modifying the articulated hand so as to be superimposed with the 3D representation. Indeed, after modification of articulated hand for the first images, subsequent images will only need rotation to superimpose the articulated hand with the 3D representation.

According to an advantageously embodiment of the invention, the 3D representation of the hand can be a model based on spheres arrangement. This is a simple sphere model using 48 spheres with flexible locations and empirically defined fixed radii. The model based on spheres can be named "hand landmark model" or "hand keypoints detection". The hand is no longer considered as a single unit, but instead is split up as a model of N keypoint(s) of interest, representative of the different articulations. Knowing the position of each finger joint should provide enough information to detect which pose the hand is in or which gesture the hand is doing.

Each of the five fingers has four degrees of freedom (DoF), two are for the base of the finger to represent flexion and abduction of the finger, two for flexion for the remaining joints. The whole hand has a 6DoF global: 3 DoFs are for global location and the remaining 3 DoFs are for global hand orientation. In order to avoid an implausible articulated hand pose, kinematic constraints are added to the hand model to keep the joint angles within a valid range.

Advantageously, the assembly of cameras can comprise cameras fixed together immobile with respect to one another, the fields of view of the cameras overlap in a common area. Preferably, the common area is the field of view of the depth camera. Indeed, the depth camera provides the 3D positions of each pixel. Some 3D positions are used as landmarks in the 3D graphical application.

According to the invention a calibration step can be carried out to determine transfer matrices between cameras of the assembly. Said matrices can be used for identifying the same part of the hand in different images of the same point of view. The matrices are also used to project the articulated hand in images of different cameras. In particular, when the fields of view of the cameras are different, cameras of the type having a smaller field of view can be added so as to cover the field of view of the camera having the largest field of view.

According to an advantageously embodiment of the invention the articulated hand has the dimensions of the captured hand.

Advantageously, the 3D model of the articulated hand can be based on inverse kinematics. This method of inverse kinematics allows a free modification of the pose of the articulated hand and makes it possible to solve the problems linked to the respect of the size of the elements and the overall consistency of the hand. For example, during the step of capturing, each camera captures images at a same speed, for example 30, 45 or 60 frames per second. For example, during the step of capturing, images are stored in a DAT format. The DAT format images can be converted to PNG format during a step of sorting images. The DAT format allows to backup all data obtained for all images captured.

According to an advantageously embodiment of the present invention, the 3D camera can comprise a second 2D camera, for example of RGB type, and a depth camera; the 3D representation being created by combining data coming from images captured at the same time from the second 2D camera and the depth camera.

According to an embodiment of the invention, the creation step of 3D representation comprises a step of transforming images from the second 2D camera and/or the depth images to have the same image resolution. When the images from the second 2D camera are RGB type, the depth images can for example be converted in the RGB coordinate system. To associate each RGB pixel with a depth data, transfer matrices can be used to switch from one image to another.

According to the invention, the cameras can be configured to operate in a six degrees of freedom (6DOF) and the data of the cameras can be processed as six degrees of freedom in the 3D engine.

According to an advantageously embodiment of the invention, when annotation points are determined for a first point of view, for the subsequent points of view, the step of modifying the articulated hand is automatically made based on six degrees of freedom data. When the user is satisfied with their pose, 22 annotation points can be stored for the four images. The next frame of the recording is displayed. The user is not starting from scratch. As the subject of the video has not changed pose and it is just the camera that has moved, the articulated hand pose is fixed for all frames in the recording. The articulated hand has to be translated or tilted for t+N frames. If the 3D camera additionally has a 6 DOF system, this tracking annotation could be automated. The 3D engine could take the 6 DOF data recorded for every frame and apply it to a virtual camera. As the cloud of spheres is attached to this virtual camera, the movement during recording is applied to this camera and the cloud of spheres should automatically position itself in the articulated hand.

According to another aspect of the invention, it is proposed a computer program product, comprising: a computer-readable storage device; and a computer-readable program code stored in the computer-readable storage device, the computer-readable program code containing instructions that are executed by a central processing unit (CPU) of a computer system to implement a method of:

creating a 3D representation of a hand from a 3D image comprising the hand,
considering a 3D model of an articulated hand wherein annotation points are predefined,
modifying the articulated hand so as to be superimposed with the 3D representation,
considering a 2D image of the hand captured at the same time and according to a same point of view as the 3D image,
superimposing the modified articulated hand on the hand captured on the 2D image,
applying the annotation points of the modified articulated hand on the hand captured on the 2D image,
storing the 2D image with annotation on the hand.

BRIEF DESCRIPTION OF THE DRAWINGS

For the purpose of illustrating the invention, there is shown in the drawings a form that is presently preferred; it is being understood, however, that this invention is not limited to the precise arrangements and instrumentalities.

DETAILED DESCRIPTION

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention as defined by the appended claims.

Hereinafter, the present invention will be described in detail by explaining exemplary embodiments of the invention with reference to the attached drawings.

Although the invention is not limited to it, the following description refers to a method for representing annotation points on a hand displayed on images. The images are acquired by using an assembly of cameras comprising a monochrome 2D camera and a RGB camera associated with a depth camera. Advantageously, the monochrome 2D camera is a camera used in a virtual reality headset or in an augmented reality portable device or to any portable computing device which comprises software and hardware components suitable to implement virtual reality and/or augmented reality.

One object of the invention is to build several thousands of 2D images of hands annotated in order to feed a machine learning model as training data. Said engine being intended to be integrated in the virtual reality and/or augmented reality device.

Figure 1:
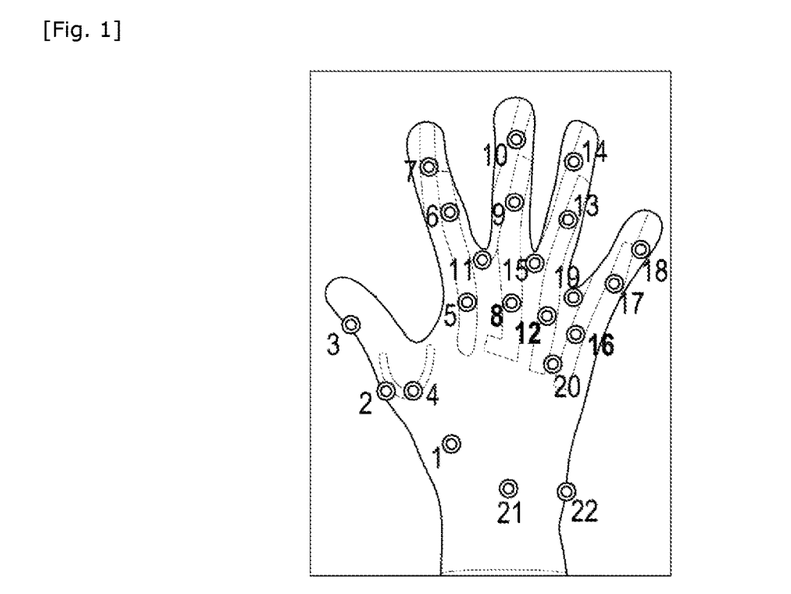
FIG. 1 is a general view of a hand wherein 22 annotation points are represented.

On FIG. 1 is illustrated a hand wherein 22 annotation points are placed on joints and other strategic area of the hand. More or less annotation points can be used in the same or different places on the hand.

Each finger comprises several points. Some points are arranged out of the fingers, in areas allowing an effective identification of the whole hand. The aim of the present invention is to quickly create several 2D images of hands in different environments (exposure, color . . . ).

Figure 2:
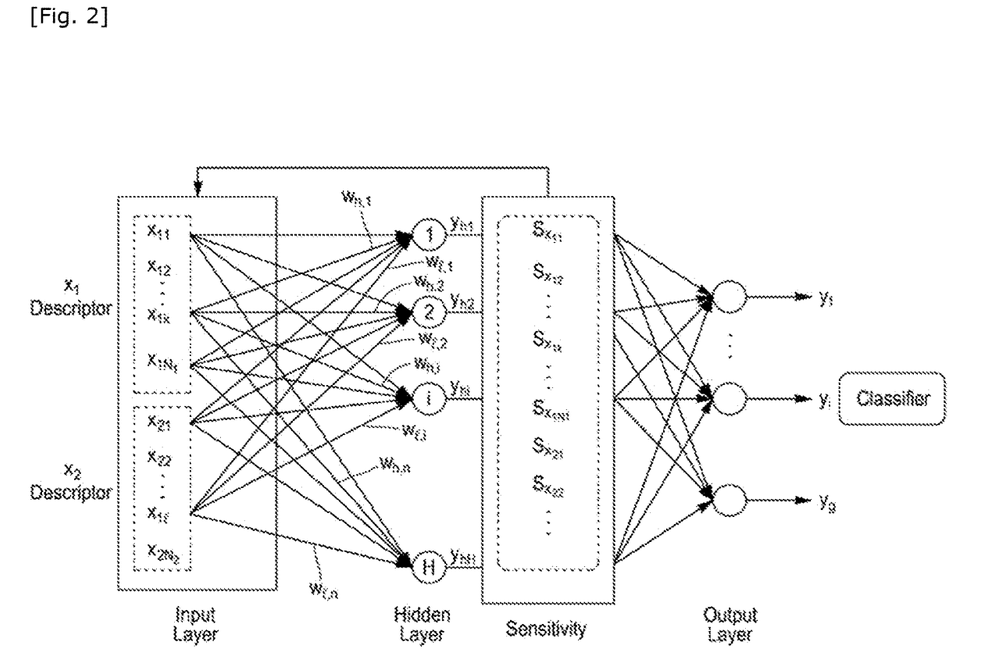
FIG. 2 is a general view of a neural network.

FIG. 2 shows a neural network that can be used as machine learning model to predict a hand. This neural network comprises an input layer fed by two descriptors with training dataset. A hidden layer is composed of nodes to propagate decisions towards an output layer.

There is a sensitivity layer allowing a measure of the quality of the model according to the proportion of false positives, false negatives, true positives, etc. For example, a true positive can be a hand pixel identified as a hand element and a false negative can be a background pixel labeled as a hand pixel. The higher the sensitivity value, the greater the amount of true positives and the fewer false negatives. Low sensitivity means there are fewer true positives and more false negatives.

Figure 3:
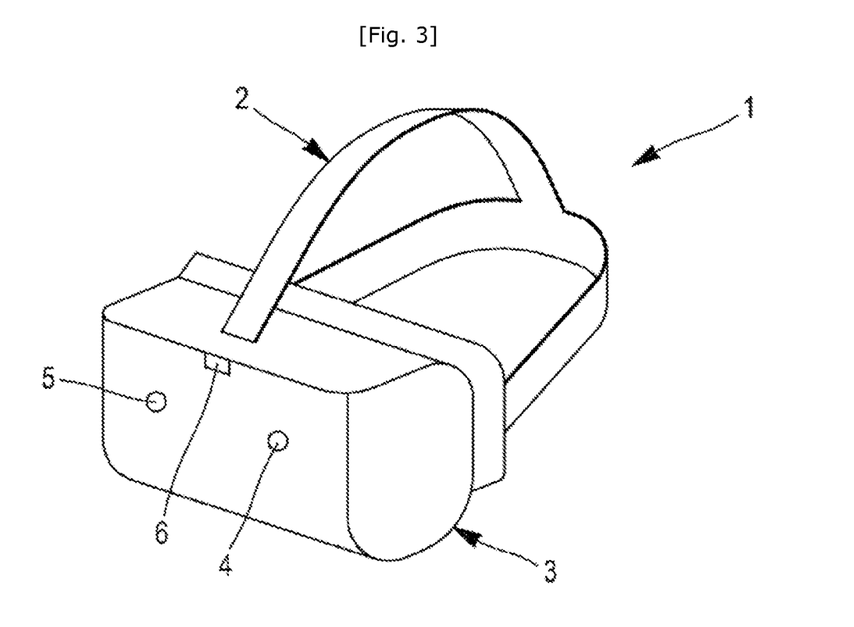
FIG. 3 is a general view of a virtual reality headset comprising 2D camera and engine according to the invention.

This machine learning model can be used in a virtual reality (VR) headset 1 as illustrated on FIG. 3. The headset is equipped with software and hardware to implement a motion tracking. The headset is intended to be worn by a user all around the eyes. The user can look around a virtual space as if he is actually there.

The VR headset can provide an accurate position tracking as it uses a six-degrees-of-freedom (6DoF) motion position. It can accurately follow the direction and the position of the user: moving forward, backward, up, down, left, or right.

The band 2 is used to maintain the headset on the head.

The front rigid body 3 includes electronic components. Preferably, all components are integrated in the front rigid body 3 in order to optimize compactness, reliability and processing speed.

A first and second monochrome cameras 4, 5 are visible from the front side of the headset. Those cameras 4 and 5 are used to capture the environment around the user. An illuminator 6 is provided arranged on the forehead of the headset 1, for example at equal distances from the two cameras 4 and 5. The cameras 4 and 5, for example Infrared cameras, are each a 2D camera according to the invention.

According to the invention said cameras have to be used in an assembly of cameras in order to acquire 2D images based on the method according to the invention. Then, the machine learning model will be designed using training data obtained thanks to said 2D cameras.

Figure 4:
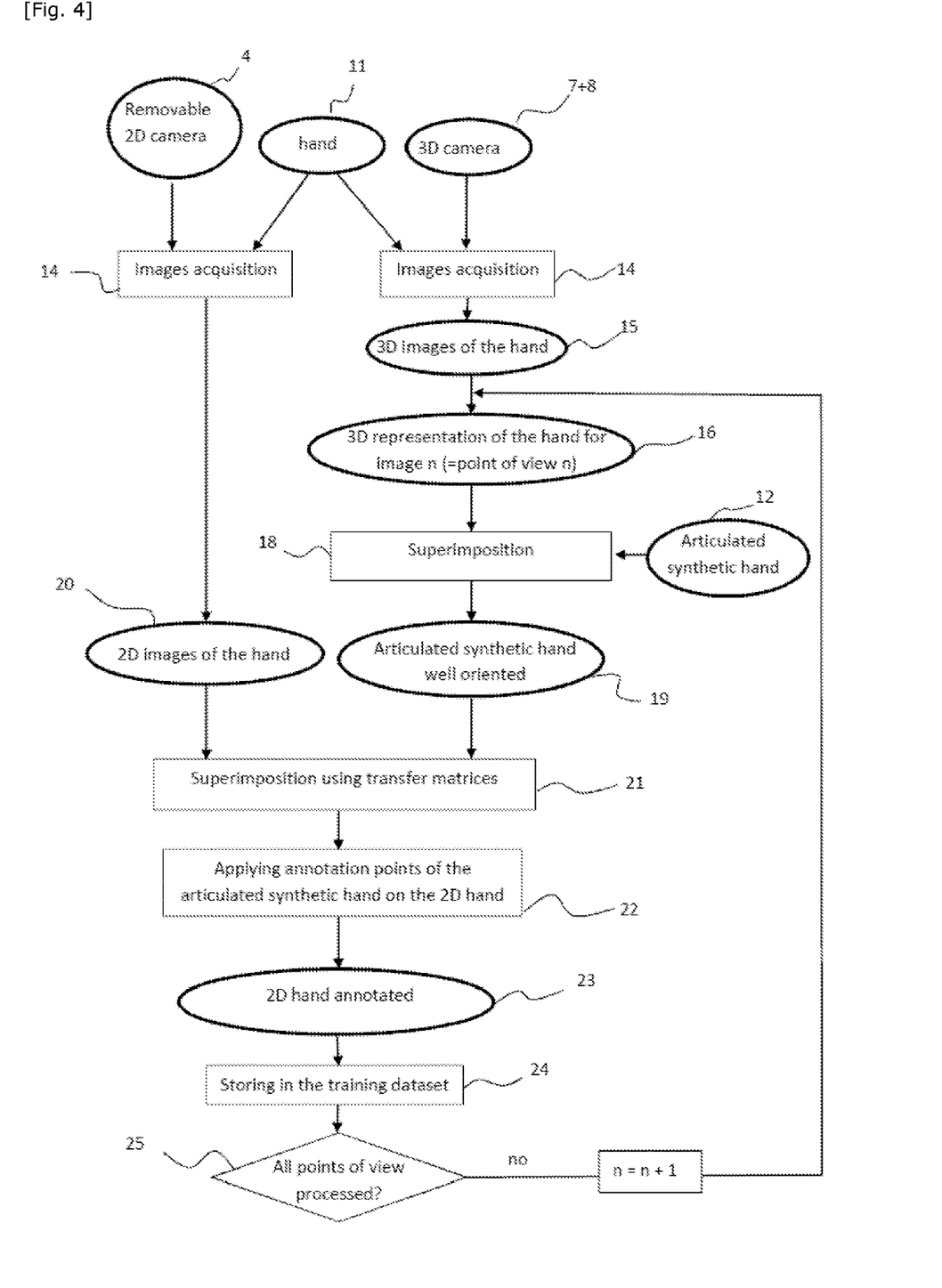
FIG. 4 is a flowchart illustrating a method according to the invention for annotating hands on images acquired by a 2D camera according to the invention.
Figure 5:
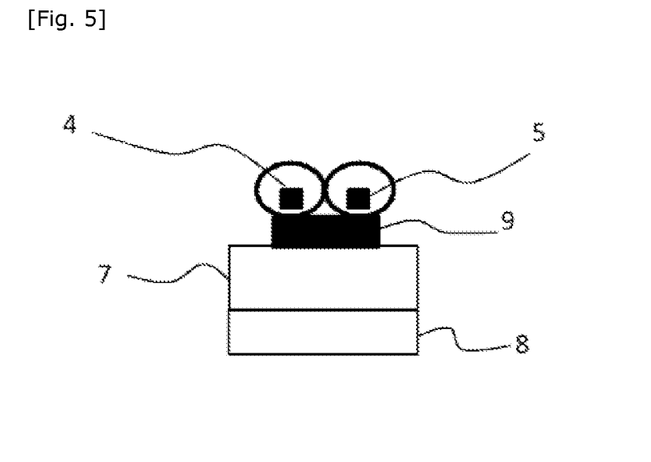
FIG. 5 is a general view of an assembly of cameras comprising at least one 2D camera and one 3D camera.

A method according to the present invention will now be described based on FIGS. 4-6. FIG. 4 shows a flowchart starting with two images acquisitions 14 in parallel at the same time. To do that, an assembly of cameras as illustrated on FIG. 5 is used. The assembly comprises two 2D cameras 4 and 5. Said cameras are firmly fixed to a 2D RGB camera 7 by means of a fixing device. A depth camera 8 is provided under the camera 7. The cameras 4, 5, 7 and 8 of the assembly are securely attached without relative movement in relation to each other. This is interesting to facilitate the conversion of coordinates from one camera to another.

Although the assembly on FIG. 5 shows a 2D RGB camera 7 associated with a depth camera 8 or a depth sensor, the combined cameras 7 and 8 can preferably be replaced by a single 3D camera as illustrated on FIG. 4.

For the sake of simplification, the method according to the invention is illustrated with a removable 2D camera as monochrome camera of an VR headset and a 3D camera assembled together. The removable 2D camera is one of both cameras 4 and 5, for example camera 4.

Once the two cameras have been merged, the procedure is as follows:
the subject adopts a pose with his hand 11 and maintains his pose during the recording of a video;
the assembly of cameras turns around the subject's hand, varying the possible points of view.

The method of the invention comprises images acquisition steps 14 where all cameras acquire images for different points of view. The acquisition can be done at any speed; the most important thing is that the recording of images from each camera is done at the same time. In other words, a given moment must be materialized by as many images as there are cameras associated with the assembly. In the present case, a moment in the acquisition step includes two images: the image of the 2D camera 4 and the image of the 3D camera. The acquisition is made at 30 FPS, generating 30 sample images in 3D RGB and one monochrome image in one second.

The removable 2D camera acquires 2D images of the hand 20.

The removable 3D camera acquires 3D images of the hand 15.

The acquired 3D images 15 are then transferred to a 3D engine that build a 3D representation 16 of the hand 11 for image n, n being a number from 1 to the total number of images acquired and that have to be processed. Each 3D image corresponds to a 2D image for the same point of view for the same time of acquisition.

Figure 6:
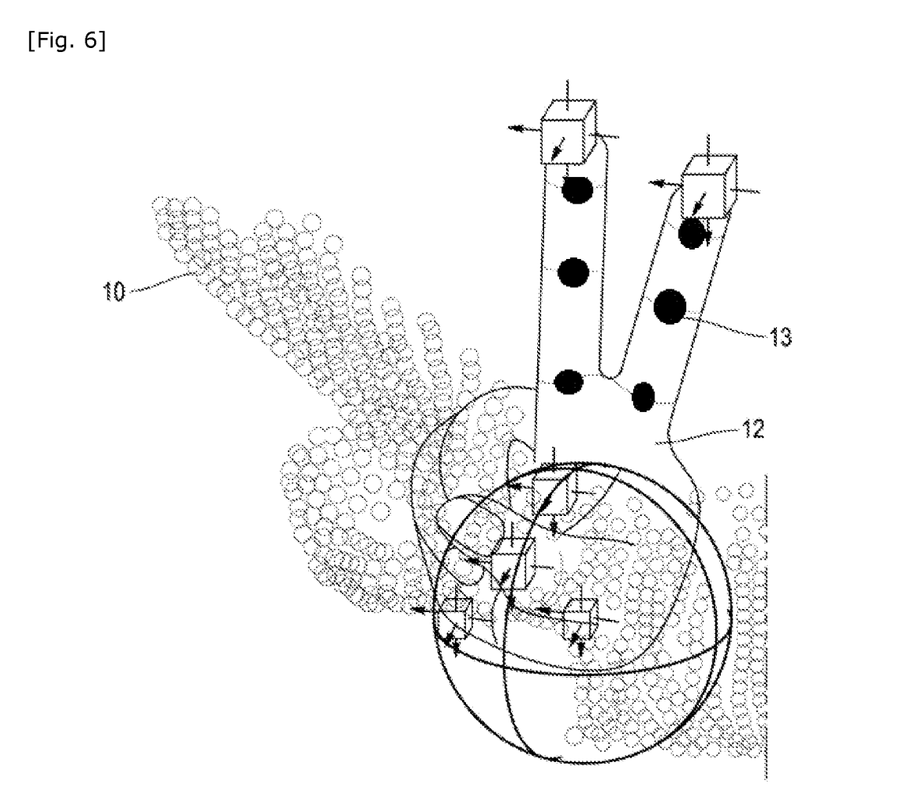
FIG. 6 is a general view of a 3D representation of a hand build from 3D camera and an articulated synthetic hand with predefined annotation points.

FIG. 6 shows such a 3D representation 10 designed by means of a sphere model using 48 spheres with flexible locations and empirically defined fixed radii. Each of the five fingers has 4 degrees of freedom (DoF): two are for the base of the finger to represent flexion and abduction of the finger, two for flexion for the remaining joints, while the whole hand has the 6 DoF global (3 DoFs are for global location and the remaining 3 DoFs are for global hand orientation). In order to avoid an implausible articulated hand pose, kinematic constraints are usually added to the hand model to keep the joint angles within a valid range.

FIG. 6 also shows a 3D model of an articulated hand 12 wherein annotation points 13 are predefined. This hand 12 is a synthetic hand corresponding to the proportions of the recorded subject's hand 11. The 3D engine is for example designed to be usable with a computer mouse or other input device. The synthetic hand 12 is designed with an inverse kinematics (IK) and is preferably modeled from the subject's hand: the size of the palm and the lengths of the fingers are as close as possible to reality. Respect for physiognomy is less necessary since inverse kinematics is designed as a safeguard and not as an extremely faithful model of the subject's flexibility.

At step 18 on FIG. 4, for each point of view, that means at a given moment, the objective is to superimpose the articulated synthetic hand 12 on the 3D representation 16. This superimposition can be made automatically or by a user.

The user is free to modify the pose of the synthetic hand. The inverse kinematics system is present to help solving problems related to respecting the size of the elements and the overall consistency of the hand. The primary objective of the user is to position the synthetic palm of the hand in the cloud of spheres. Drag & drop allows the user to translate the synthetic hand 12. For rotation, axes are drawn around the 3D representation, the user can grab them and tilt them until they see the desired orientation.

Once the palm of the synthetic hand is positioned, the user can adjust the fingers. In this way, the user does not position each phalanx of the synthetic hand, the reverse kinematics takes care of positioning the other key points of the finger according to the location of the target and the constraints of the synthetic palm. Predefined poses can be available, by choosing the pose of a gesture, the user obtains a synthetic hand adopting the pose of the selected gesture. This allows him to get closer to the actual pose more quickly, all that remains is to adjust the target slightly with his fingers.

At the end of the handling, a well oriented articulated synthetic hand 19 is obtained.

At step 21, the well oriented articulated synthetic hand 19 is projected on the 2D image 20 coming from the 2D camera 4. This 2D image has been acquired at the same time, that means the same point of view, as the 3D image used to create the 3D representation 16. The projection uses transfer matrices between the 3D image and the 2D image to correctly position the well oriented articulated synthetic hand 19 on the hand displayed on the 2D images 20. The annotation points of the well oriented articulated synthetic hand 19 are then applied on the 2D image at step 22 to obtain the 2D hand annotated 23.

On step 24 the 2D hand annotated 23 is stored in the training dataset. Then, at step 25, the engine checks if all images are processed. If not, a new 3D representation is created at 16 for a new point of view. And this 3D representation is processed up to the storing in the dataset. For the processing of this new 3D representation, the user is not starting from scratch. Since the subject of the video has not changed pose and it is just the camera that has moved, the synthetic hand pose is fixed for all frames in the recording. The user only has to translate or tilt the synthetic hand for t+N frames.

The method according to the invention has several advantages. It can be adapted to all available cameras since the 2D camera is replaceable. The annotation phase is much faster and more precise than the manual annotation of each key point. Since it does not depend on an iteration algorithm or an ML model, it takes place in real time. The estimated time for annotating the first image is 2 minutes and then 5 seconds for each subsequent image in the sequence. For a sequence of 1 minute at 30 FPS, for a total of 1,800 images, the annotation of the latter would last 2 hours and 30 minutes.

This estimate makes more sense when compared to that of a conventional 22-points manual annotation which would amount to 150 hours for the same volume of images.

With the method according to the invention, training data comprising hands annotated on 2D images are obtained. The same data will be used for the training of a machine learning model that will be used in a device; this device also being provided with a 2D camera used for the acquisition of 2D images during the method of the invention.

Numerous variations and modifications will become apparent to those skilled in the art once the above disclosure is fully appreciated. It is intended that the following claims be interpreted to embrace all such variations and modifications.

The invention claimed is:

1. A method for annotating points on a 2D image of a hand, the method comprising:
    imaging the hand from different points of view using an assembly of cameras comprising at least: 2D camera and a 3D camera;
    creating a 3D representation of the hand from images captured with the 3D camera;
    considering a 3D model of an articulated hand wherein annotation points are predefined;
    for each of the different points of view:
        modifying the articulated hand so as to be superimposed with the 3D representation;
        considering a 2D image captured from the 2D camera;
        superimposing the modified articulated hand on the 2D image;
        applying the annotation points of the modified articulated hand on the 2D image; and
        storing the 2D image with the annotation points.

2. The method according to claim 1, wherein during the step of capturing, the hand keeps the same gesture, and the assembly of cameras turns relatively around the hand.

3. A computer program product, comprising:
    a non-transitory computer-readable storage device; and
    a computer-readable program code stored in the non-transitory computer-readable storage device, the computer-readable program code containing instructions that are executed by a central processing unit (CPU) of a computer system to implement a method of:
    creating a 3D representation of a hand from a 3D image comprising the hand;
    considering a 3D model of an articulated hand wherein annotation points are predefined;
    modifying the articulated hand so as to be superimposed with the 3D representation;
    considering a 2D image of the hand captured at the same time and according to a same point of view as the 3D image;
    superimposing the modified articulated hand on the hand captured on the 2D image;
    applying the annotation points of the modified articulated hand on the hand captured on the 2D image; and
    storing the 2D image with annotation on the hand.

4. A device comprising:
    a non-transitory computer-readable storage device; and
    at least one processor coupled to the non-transitory computer-readable storage device, the at least one processor being configured to execute the instructions to:
    create a 3D representation of a hand from a 3D image comprising the hand;
    consider a 3D model of an articulated hand wherein annotation points are predefined;
    modify the articulated hand so as to be superimposed with the 3D representation;
    consider a 2D image of the hand captured at the same time and according to a same point of view as the 3D image;
    superimpose the modified articulated hand on the 2D image of the hand;
    apply the annotation points of the modified articulated hand on the 2D image of the hand; and
    store the 2D image of the hand with the annotation points.

5. The device of claim 4, wherein the device comprises a virtual reality device.

6. The device of claim 4, wherein the 3D representation of the hand is a model based on spheres arrangement.

7. The device of claim 4 comprising an assembly of cameras that includes at least a 2D camera and a 3D camera, wherein the assembly of cameras are fixed together immobile with respect to one another and have fields of view that overlap in a common area.

8. The device of claim 7, wherein the 3D camera comprises a depth camera, and the common area includes a field of view of the depth camera.

9. The device of claim 7, wherein the at least one processor executes the instructions to perform a calibration step to determine transfer matrices between the assembly of cameras.

10. The device of claim 7, wherein when the fields of view of the cameras are different, cameras of a type having a smaller field of view are added so as to cover a field of view of a camera having a largest field of view.

11. The device of claim 4, wherein the articulated hand has dimensions of the hand.

12. The device of claim 4, wherein the 3D model of the articulated hand is based on inverse kinematics.

13. The device of claim 4 comprising an assembly of cameras, wherein each camera of the assembly of cameras captures images of the hand at a same speed.

14. The device of claim 13, wherein the at least one processor executes the instructions to store the images in a DAT format.

15. The device of claim 14, wherein the at least one processor executes the instructions to convert the DAT format images to a PNG format.

16. The device of claim 4 comprising a 2D camera and a depth camera, wherein each of the 2D camera and the depth camera capture images of the hand at a same time, and wherein the at least one processor executes the instructions to create the 3D representation by combining data from the captured images.

17. The device of claim 16, wherein the at least one processor executes the instructions to transform the images captured with the 2D camera and the depth camera to have a same image resolution.

18. The device of claim 16, wherein the 2D camera is a monochrome or a RGB or a thermographic camera.

19. The device of claim 16, wherein the 2D camera and the depth camera are configured to operate in six degrees of freedom, and wherein the at least one processor executes the instructions to process the data from the captured images in a six degrees of freedom.

20. The device of claim 19, wherein the captured images correspond to different points of view of the hand, and wherein the at least one processor executes the instructions to:

determine the annotation points for a first point of view; and for subsequent points of view, modify the articulated hand based on the data from the captured images in the six degrees of freedom.

\* \* \* \* \*